United States Patent
Bai et al.

(10) Patent No.: US 7,688,546 B1
(45) Date of Patent: Mar. 30, 2010

(54) PERPENDICULAR MAGNETIC RECORDING HEAD HAVING NONMAGNETIC INSERTION LAYERS

(75) Inventors: Zhigang Bai, Fremont, CA (US); Peng Luo, Fremont, CA (US); Kroum S. Stoev, Pleasanton, CA (US); Francis H. Liu, Fremont, CA (US); Yugang Wang, Milpitas, CA (US); Adam F. Torabi, Pleasanton, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 764 days.

(21) Appl. No.: 11/643,493

(22) Filed: Dec. 21, 2006

(51) Int. Cl.
*G11B 5/17* (2006.01)

(52) U.S. Cl. .................................... 360/126

(58) Field of Classification Search .................. None
See application file for complete search history.

(56) References Cited

U.S. PATENT DOCUMENTS

| | | | |
|---|---|---|---|
| 6,525,904 B1 | 2/2003 | Sasaki | |
| 6,728,065 B2 | 4/2004 | Batra et al. | |
| 6,906,894 B2* | 6/2005 | Chen et al. | 360/125.12 |
| 6,965,494 B2 | 11/2005 | Campbell et al. | |
| 7,031,121 B2* | 4/2006 | Khera et al. | 360/317 |
| 7,271,982 B2* | 9/2007 | MacDonald et al. | 360/125.02 |
| 7,388,732 B2* | 6/2008 | Le | 360/125.08 |
| 2004/0150912 A1 | 8/2004 | Kawato et al. | |
| 2004/0151036 A1 | 8/2004 | Aoyagi et al. | |
| 2005/0280938 A1 | 12/2005 | Sasaki et al. | |
| 2005/0280939 A1 | 12/2005 | Sasaki et al. | |
| 2006/0002019 A1 | 1/2006 | Guthrie et al. | |
| 2006/0028762 A1 | 2/2006 | Gao et al. | |
| 2006/0044680 A1 | 3/2006 | Liu et al. | |

OTHER PUBLICATIONS

Daniel Z. Bai, et al. Writer Pole Tip Remanence in Perpendicular Recording, IEEE Transactions on Magnetics, 2006.
K. Nakamoto, et al. Single-Pole/TMR Heads for 140-Gb/in2 Perpendicular Recording, IEEE Transactions on Magnetics, vol. No. 1, Jan. 2004.
Yuchen Zhou, et al. Dependence of the pole-tip remanence on the medium magnetization state underneath the trailing shield of a perpendicular write head, Journal of Applied Physics 97, 10N518 2005.

* cited by examiner

*Primary Examiner*—Mark Blouin

(57) ABSTRACT

The method and system provide a perpendicular magnetic recording (PMR) head having an air bearing surface (ABS). The PMR head includes first and second poles each having front and back gap regions, a first nonmagnetic insertion layer between the back gap regions, a magnetic pole layer with a front terminating at the ABS, a write gap, shield(s), a second nonmagnetic insertion layer between the second pole back gap region and the shield(s), and coil(s) between the shield(s) and the first pole. The magnetic pole layer terminates between the ABS and the second pole back gap region and has pole angle(s) of at least thirty and not more than fifty degrees. At least part of the magnetic pole layer resides on the second pole. Part of the shield(s) are adjacent to the write gap. Another part of the shield(s) is coupled with the second pole back gap region.

27 Claims, 6 Drawing Sheets

PERPENDICULAR MAGNETIC RECORDING HEAD HAVING NONMAGNETIC INSERTION LAYERS

FIELD OF THE INVENTION

The present invention relates to magnetic recording technology, and more particularly to a method and system for providing a perpendicular magnetic recording head having nonmagnetic insertion layers.

BACKGROUND

FIG. 1 depicts a conventional perpendicular magnetic recording (PMR) head 10 used in recording a PMR media (not shown). The conventional PMR head 10 is typically used as a write head in a merged head including the PMR head and a read head. The conventional PMR head 10 includes a first pole (P1) 12, P1 pad 14, a first coil 16, insulator 18, a second pole (P2) 20, a magnetic pole layer (main pole) 22, write gap 24, a shield pad 26, a second coil 28, and shield 30. Although depicted as a single shield 30, it is typically composed of two portions 30A and 30B that are formed separately. The PMR head 10 is also depicted with two coils 16 and 28. However, PMR heads having a single coil may also be used.

In order to write data to a PMR media, the coils 16 and 28 are energized. Consequently, the main pole 22 is magnetized and the media written by flux from the pole tip 22A. Based on the direction of current through the coils 16 and 28, the direction of magnetic flux through the main pole 22 changes. Thus, bits having opposing magnetization can be written and the desired data stored on the PMR media. When the conventional PMR head 10 is not writing, no current is driven through the coils 16 and 28. When in this quiescent state, the remanence (zero current) magnetization of the poles 12, 20, and 22 is desired to be approximately zero.

The conventional PMR head 10 is desired to be used at higher recording densities.

In such applications, domain lockup, also termed remanent erasure, is an issue. Domain lockup occurs when the conventional PMR head 10 inadvertently erases data in the PMR media when no current energizes the PMR head 10. This occurs due to a remanent field remaining the main pole 22. Domain lockup is sensitive to the shape anisotropy of the pole tip 22A. A long nose length, NL, or the length of the pole tip 22A from the air-bearing surface (ABS) to the flaring point, is more likely to cause domain lockup. Without lamination of the main pole 22, the nose length typically must be no greater than about twice of the physical track width (perpendicular to the page in FIG. 1). Consequently, most PMR heads 10 have a short nose length. For such PMR heads 10, the primary cause of pole erasure is the magnetic domains in the yoke that may not fully relax after writing. Stated differently, the main pole 22 may not completely demagnetize after writing. Further, the pole tip 22A is sufficiently small that such deviations of the magnetization domains in the pole 22 from a perfectly demagnetized state may produce significant magnetization in the pole tip 22A. As a result, a high remanent field may be present in the PMR media even when no current is driven through the coils 16 and 28. This remanent field may erase data recorded on the PMR media after the head 10 passes over the media for many revolutions. Because it involves this inadvertent erasure, domain lockup is undesirable.

Domain lockup may result not only in inadvertent erasure of data, but also failure of the PMR media. The servo areas (not shown) of the PMR media are usually written at much lower linear density than the areas that store user data. Consequently, the servo areas are more subject to being erased by the remanent field of the PMR head 10. Erasure of servo areas may cause complete drive failure. Therefore, it would be highly desirable for domain lockup to be eliminated.

Various methods have been used to reduce domain lockup. These methods may have significant drawbacks. For example, FIG. 2 depicts a conventional PMR head 10' in which domain lockup is attempted to be addressed. The PMR head 10' contains components that are analogous to the conventional PMR head 10. Consequently, the PMR head 10' is labeled similarly. The PMR head 10' includes P1 12', P1 pad 14', first coil 16', insulator 18', a magnetic pole layer (main pole) 22', write gap 24', shield pad 26', second coil 28', and shield 30'. Note that the PMR head 10' does not include a second pole analogous to P2 20. In addition, the conventional PMR head 10' includes a small nonmagnetic layer 34 directly behind the main pole 22'. Although the PMR head 10' has somewhat reduced domain lockup, it suffers from other drawbacks. In addition, the amount by which domain lockup is reduced may be relatively small.

Accordingly, what is needed is a system and method for reducing domain lockup in a PMR head.

SUMMARY

The method and system for providing a PMR head having an air bearing surface ABS. The method and system include providing first and second poles each including front and back gap regions, a first nonmagnetic insertion layer residing between the back gap regions of the first and second poles, a magnetic pole layer terminating at the ABS, a write gap adjacent to the front of the magnetic pole layer, shield(s), a second nonmagnetic insertion layer residing between the second pole back gap region and the shield(s), and coil(s) residing between the shield(s) and the first pole. The first and second pole back gap regions are coupled. The magnetic pole layer has a front and a back terminating between the ABS and the second pole back gap region. The magnetic pole layer has at least one pole angle of at least thirty and not more than fifty degrees. At least a portion of the magnetic pole layer resides on the second pole. A first portion of the shield(s) is adjacent to the write gap. A second portion of the shield(s) is coupled with the second pole back gap region.

DETAILED DESCRIPTION OF THE PREFERRED EMBODIMENTS

Figure 1:
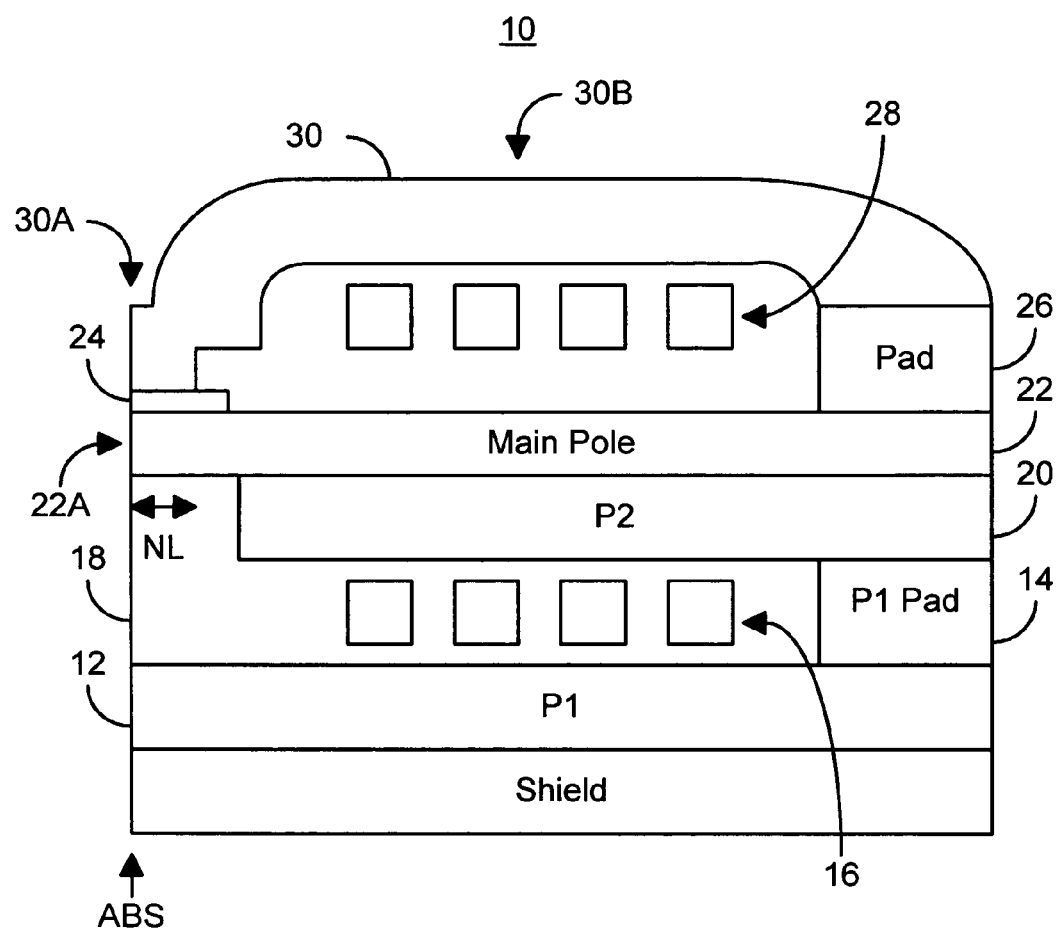
FIG. 1 is a diagram depicting a conventional PMR head.
Figure 2:
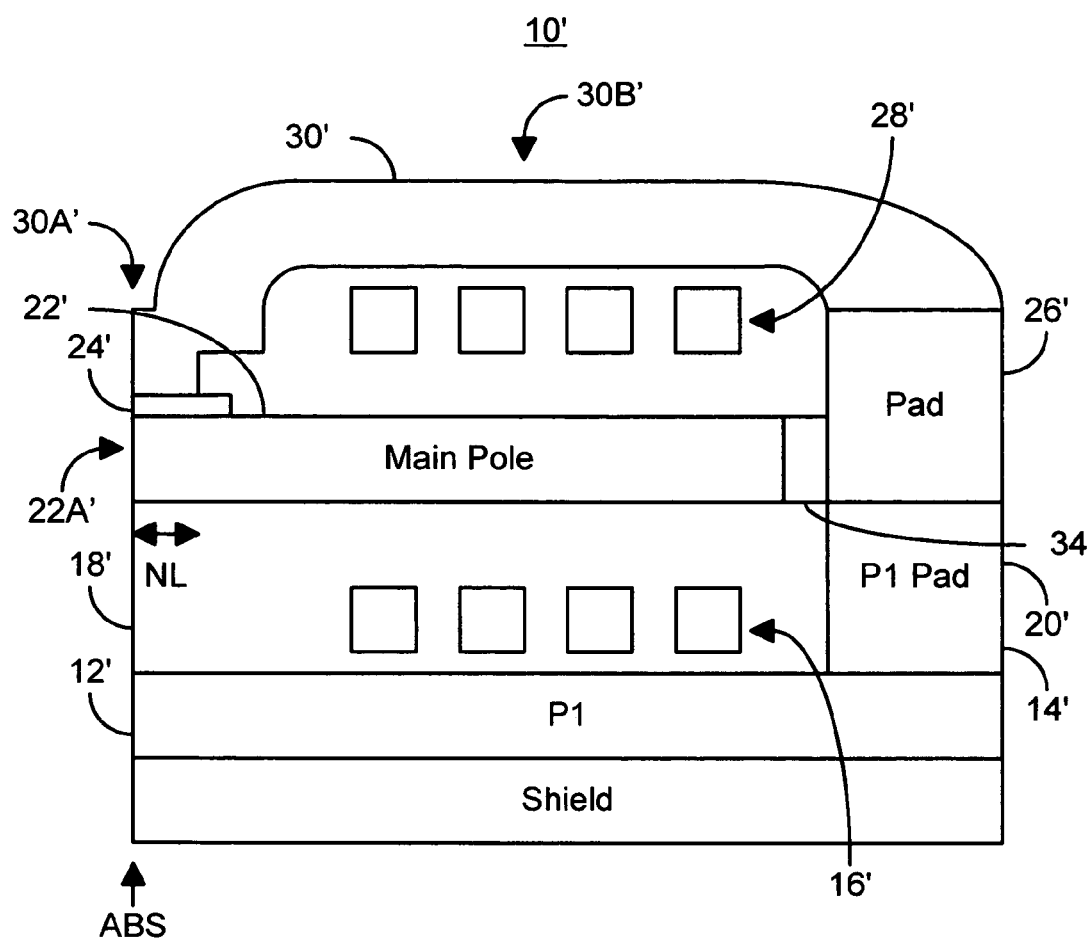
FIG. 2 is a diagram depicting another conventional PMR head.
Figure 3:
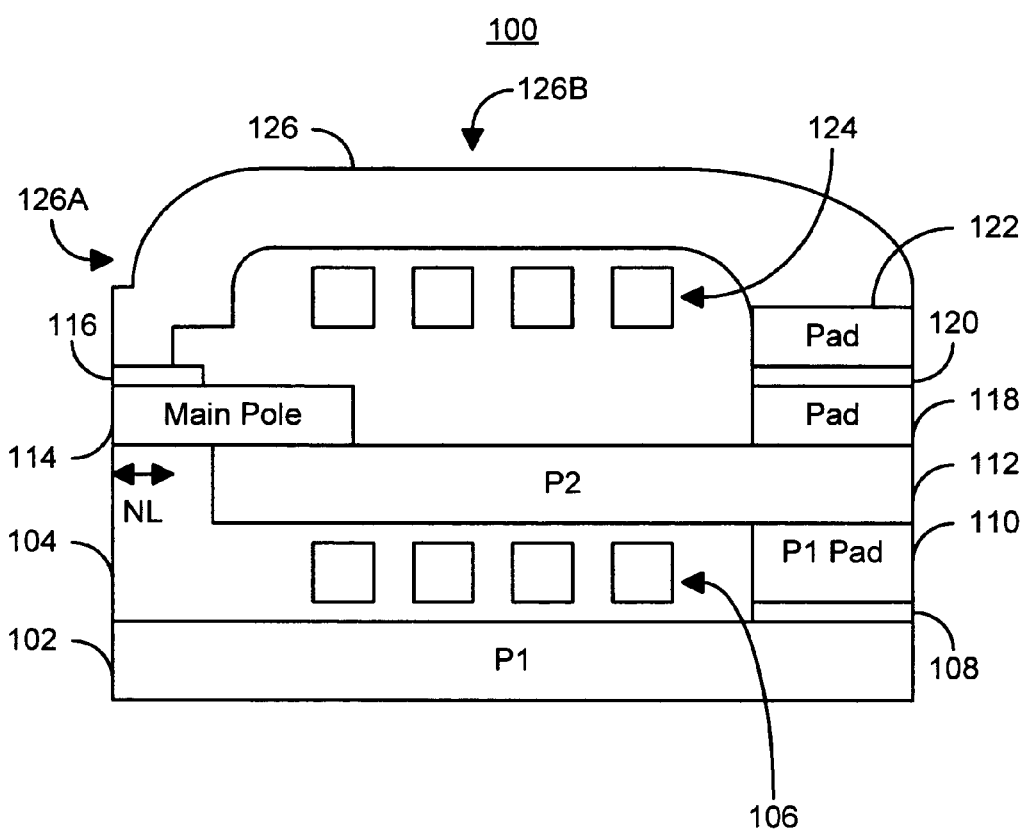
FIG. 3 is a diagram depicting an exemplary embodiment of a PMR head.

FIG. 3 is a diagram depicting an exemplary embodiment of a PMR head 100 used to record to PMR media (not shown). The PMR head 100 includes a P1 102, insulator 104, a first coil 106, P1 pad 110, P2 112, a magnetic pole layer (e.g. the main pole) 114, write gap 116, shield pad(s) 118 and 122, a second coil 124, and shield 126. In addition, the PMR head 100 includes nonmagnetic insertion layers 108 and 120. Although depicted as a single shield 126, it is typically composed of two portions 126A and 126B that are formed separately. Furthermore, although depicted as and termed a magnetic pole layer, the magnetic pole layer 114 may be a composite structure such as a laminate including multiple layers. The PMR head 100 is preferably used as a write head in a merged head including the PMR head(s) and read head(s). However, in an alternate embodiment, the PMR head 100 may be utilized in a separate writer. In a preferred embodiment, a read head would be fabricated below (in FIG. 3) the PMR head 100.

The P1 102 preferably extends from a front region at or in proximity to the ABS to the back gap region. Thus, the P1 102 may also reside between the magnetic pole layer 114 and a top reader shield. The P1 102 may shield the bottom coil 104 from the reader. As a result, read head instability may be reduced. P2 112 also has a front region in proximity to the ABS and terminates in the back gap region. The coil 106 preferably resides between P1 102 and P2 112. A rear portion of the magnetic pole layer 114 resides on the front portion of P2 112. A front portion of the magnetic pole layer 114 terminates at the ABS and is used in writing to the PMR media. The second coil 124 resides above the P2 112. The portion 126A of the shield 126 resides approximately to the front of the coil 124, while a remaining portion of the shield 126B is located substantially above the coil 124.

The nonmagnetic insertion layers 108 and 120 are preferably metallic, for example including materials such as Ru, Au, and Ta. The nonmagnetic insertion layers 108 and 120 also reside at the back gap region of the PMR head 100. Thus, the nonmagnetic insertion layer 108 resides at the back gap portion of P1 102. The nonmagnetic insertion layer 120 resides on the pole pad 118 and is thus on the back gap region of P2 112. In a preferred embodiment, the nonmagnetic insertion layer 108 resides below the pad 110. However, in alternate embodiments, the nonmagnetic insertion layer 108 may reside above or within the pad 110. In either case, the nonmagnetic insertion layer 108 is between P1 102 and P2 112. Similarly, the nonmagnetic insertion layer 120 preferably resides between the pads 118 and 122. However, the nonmagnetic insertion layer may reside below the pad 118 or above the pad 122. In such a case, the pads 118 and 122 may be considered to form a single pad. The nonmagnetic insertion layer 120 resides between the shield(s) 126 and P2 112, preferably in the back gap region.

In a preferred embodiment, the nonmagnetic insertion layers 108 and 120 are thin. For example, the nonmagnetic insertion layer 108 may be at least ten and not more than one hundred nanometers in thickness. This nonmagnetic insertion layer 108 is preferably provided by changing the electroplating seed layer for the P1 pad 110 to the material used for the nonmagnetic insertion layer 108. In a preferred embodiment, the thickness of the nonmagnetic insertion layer 108 is between forty and sixty nanometers. The thickness of the nonmagnetic insertion layer 120 is preferably approximately the same as the thickness of the write gap 116. Consequently, the nonmagnetic insertion layer 120 preferably has a thickness of at least thirty and not more than sixty nanometers. Also in a preferred embodiment, the nonmagnetic insertion layer 120 is obtained by depositing both the write gap 116 and the nonmagnetic insertion layer 120 simultaneously and using the same material. However, the nonmagnetic insertion layers 108 and 120 may be fabricated using other means.

In operation, current is driven in opposite directions through the coils 104 and 124. Consequently, magnetic flux through the PMR head 100 forms two magnetic circuits. One circuit is from P1 102, through the back gap region of P1 pad 110, into P2 112 and the magnetic pole layer 114, then returning to P1 102. The other circuit is from the shield 126, through the back gap of pole pads 118 and 122, into the P2 12 and the magnetic pole layer 114, and returning to the shield 126. Flux from the magnetic pole layer 114 may thus be used to write to the PMR media. Depending upon the direction of the current driven through the coils 106 and 124, the direction of flux from the magnetic pole layer 114 may change. Consequently, different data can be written to the PMR media. After writing is completed, the write current in the coils 104 and 124 is turned off.

Because two coils 104 and 124 are used, twice the magnetomotive force is provided to the magnetic pole layer 114. Consequently, improved writing may be achieved. Use of the coils 104 and 124 may also reduce the inductance of the PMR head 100. However, in an alternate embodiment a single coil might be used.

Domain lockup may be reduced for the PMR head 100 using the nonmagnetic insertion layers 108 and 120. Because they are nonmagnetic, the nonmagnetic insertion layers 108 and 120 aid in breaking any magnetic circuit between P1 102 and the magnetic pole layer 114 and between the shield 126 and the magnetic pole layer 114. Thus, the nonmagnetic insertion layers 108 and 120 attenuate or stop magnetic flux that would otherwise reach the magnetic pole layer 114 when no current is driven through the PMR head 100.

Even though the nonmagnetic insertion layers 108 and 120 may reduce domain lockup, the nonmagnetic insertion layers 108 and 120 substantially do not adversely affect write performance of the PMR head 100. During normal writing, the magnetomotive force from the coils 106 and 124 is significant. Because of the strength of this force and their low thicknesses, the non-magnetic insertion layers 108 and 120 do not affect the writing efficiency significantly. Consequently, the nonmagnetic insertion layers 108 and 120 may improve domain lockup issues substantially without adversely affecting performance.

Moreover, configuration of the magnetic pole layer 114 may also reduce domain lockup. As can be seen in FIG. 3, the magnetic pole layer 114 preferably does not extend to the back gap region, on the pads 118 and 122. Use of a shortened magnetic pole layer 114 may further improve the stability of the major magnetic domains in the magnetic pole layer 114 along the direction parallel to the ABS. This is believed to be due to the shape anisotropy of the magnetic pole layer 114. Consequently, domain lockup may be further reduced.

Figure 4:
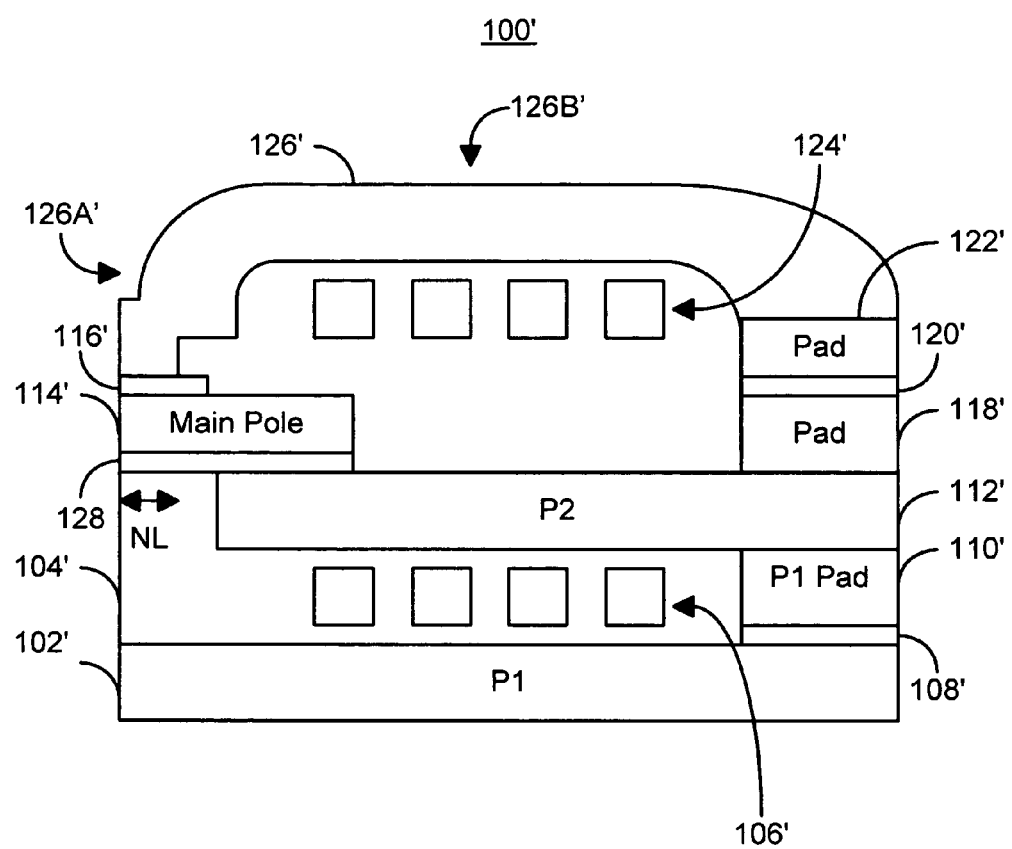
FIG. 4 is a diagram depicting another exemplary embodiment of a PMR head.

FIG. 4 is a diagram depicting another exemplary embodiment of a PMR head 100'. The PMR head 100' is configured and functions in an analogous manner to the PMR head 100. Thus, the PMR head 100' includes a P1 102', insulator 104', a first coil 106', nonmagnetic insertion layer 108', P1 pad 110', P2 112', a magnetic pole layer 114', write gap 116', shield pad(s) 118' and 122', nonmagnetic insertion layer 120', a second coil 124', and shield 126'. In addition, the PMR head 100' includes nonmagnetic insertion layer 128.

The PMR head 100' is preferably used as a write head in a merged head including the PMR head(s) and read head(s). However, in an alternate embodiment, the PMR head 100 may be utilized in a separate writer. In a preferred embodiment, a read head would be fabricated below (in FIG. 3) the PMR head 100'. Thus, the P1 102' would reside between the magnetic pole layer 114' and a top reader shield. The P1 102' may shield the bottom coil 104' from the reader. As a result, read head instability may be reduced. Similarly, the nonmagnetic insertion layer 108' may reside above, below, or within the pad 110. The nonmagnetic insertion layer 120 also resides above the pad 122', below the pad 118', or between the pads 118' and 122', as shown.

During writing, the PMR head 100' functions in an analogous manner to and has similar advantages as the PMR head 100. Because the nonmagnetic insertion layers 108' and 120' are configured in an analogous manner to the nonmagnetic insertion layers 108 and 120, domain lockup may be reduced substantially without affecting performance of the PMR head 100'. Moreover, the shortened length of the magnetic pole layer 114' may further reduce domain lockup.

The PMR head 100' also includes a third nonmagnetic insertion layer 128. The nonmagnetic insertion layer 128 is preferably metallic, for example including materials such as Ru, Au, and Ta. In a preferred embodiment, the nonmagnetic insertion layer 128 is thin. For example, the nonmagnetic insertion layer 128 may be at least ten and not more than one hundred nanometers in thickness. In a preferred embodiment, the thickness of the nonmagnetic insertion layer 128 is between forty and sixty nanometers. This nonmagnetic insertion layer 128 is preferably provided by changing the electroplating seed layer for the magnetic pole layer 114' to the material used for the nonmagnetic insertion layer 128. However, the nonmagnetic insertion layer 128 may be fabricated using other means.

The nonmagnetic insertion layer 128 further reduces domain lockup. The nonmagnetic insertion layer 128 further decouples the magnetic pole layer 114' from P2 112'. Stated differently, the nonmagnetic insertion layer 128 attenuates or stops magnetic flux that would otherwise reach the magnetic pole layer 114' when no current is driven through the PMR head 100'. This inhibits or prevents domains in P2 112' layer from affecting domains in the magnetic pole layer 114'. The robustness of low remanence in the magnetic pole layer 114' pole tip 114A' may be enhanced, reducing risk of pole erasure. Thus, domain lockup may be reduced.

Although the nonmagnetic insertion layer 128 may reduce domain lockup, the nonmagnetic insertion layer 128 does not adversely affect write performance of the PMR head 100'. The magnetomotive force from the coils 106' and 124' is strong during writing. Because of the strength of this force and its low thickness, the non-magnetic insertion layer 128 does not affect the writing efficiency significantly. Consequently, the nonmagnetic insertion layer 128 may improve domain lockup issues substantially without adversely affecting performance.

Figure 5:
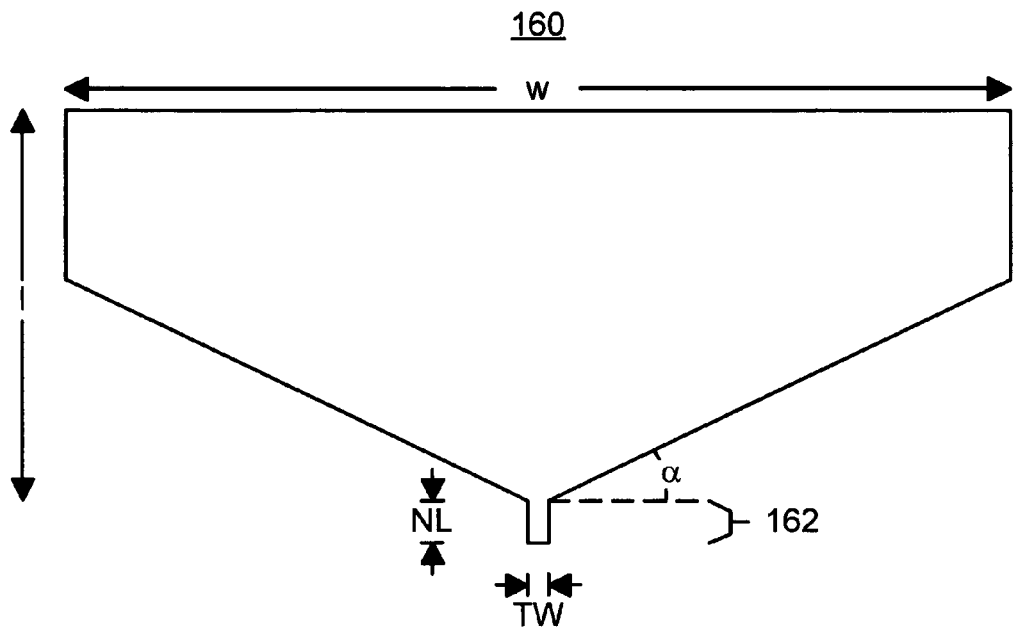
FIG. 5 is a plan view of an exemplary embodiment of a PMR head.
Figure 6:
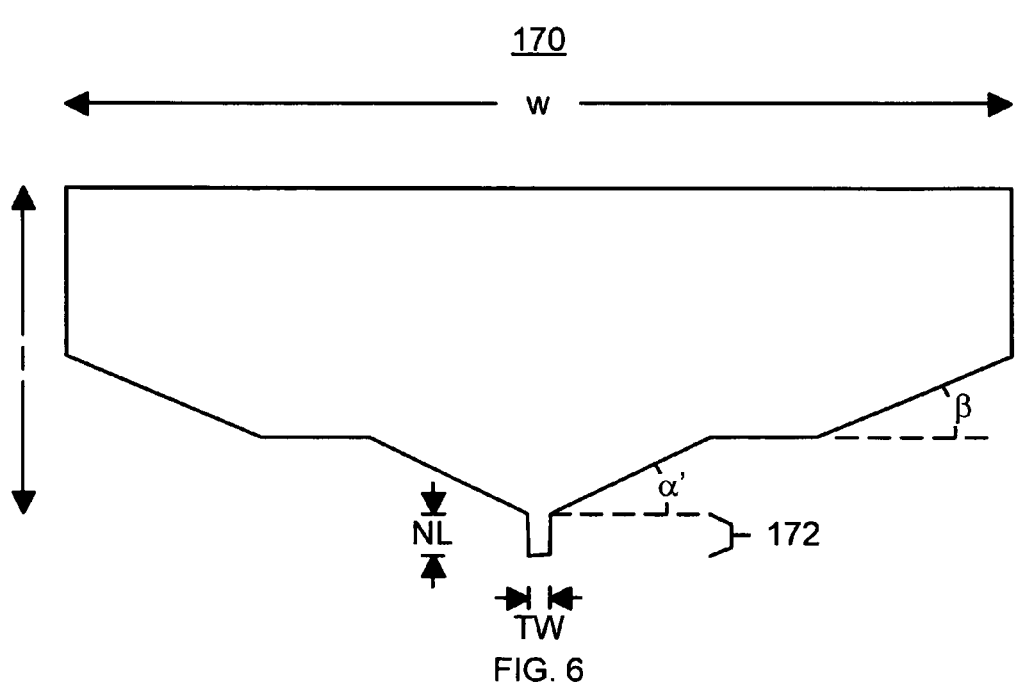
FIG. 6 is a plan view of another exemplary embodiment of a PMR head.

The PMR head 100/100', particularly the magnetic pole layer 114/114' may also be shaped in order to reduce domain lockup. FIGS. 5 and 6 are plan views of exemplary embodiments of PMR heads. In particular, magnetic pole layers 160 and 170 are depicted in FIGS. 5 and 6, respectively. The PMR pole layers 160 or 170 may be used for the magnetic pole layers 114/114' in the PMR heads 100/100'. Referring to FIG. 5, the magnetic pole layer 160 has a nose 162 characterized by a nose length and a track width. The nose 162 is preferably short. In a preferred embodiment, the nose length is preferably less than three micrometers for a track width of approximately one hundred fifty nanometers. The magnetic pole layer 160 has a yoke width w (perpendicular to the page for the magnetic pole layer 114/144' in FIGS. 3 and 4, horizontal for the magnetic pole layer 160 in FIG. 5) that is preferably at least five micron and not more than fifteen microns. However, in another embodiment, the yoke width, w, could differ. Also in a preferred embodiment, the yoke length l (length of the magnetic pole layer 160/114/114') is short. In one embodiment, the ratio of the yoke width to the yoke length (w/l) is at least two and not more than four. Moreover, the magnetic pole layer 160 is characterized by a nose angle, $\alpha$. The nose angle is at least thirty degrees and not more than fifty degrees. In a preferred embodiment, the nose angle is at least thirty-five degrees and not more than forty-five degrees. Such a shape further improves the stable and desirable alignment of domains in the magnetic pole layer 160 parallel to the ABS. Consequently, a further reduction in domain lockup may be achieved.

Referring to FIG. 6, the magnetic pole layer 170 has a nose 172 characterized by a nose length and a track width. The magnetic pole layer 170 is analogous to the magnetic pole layer 160. Thus, the nose 172 is also preferably short. In a preferred embodiment, the nose length is preferably less than three micrometers for a track width of approximately one hundred fifty nanometers. The magnetic pole layer 170 has a yoke width w (perpendicular to the page for the magnetic pole layer 114/144' in. FIGS. 3 and 4, horizontal for the magnetic pole layer 170 in FIG. 6) that is preferably at least five micron and not more than fifteen microns. However, in another embodiment, the yoke width, w, could differ. Also in a preferred embodiment, the yoke length l (length of the magnetic pole layer 170/114/114') is short. In one embodiment, the ratio of the yoke width to the yoke length (w/l) is at least two and not more than four. Like the magnetic pole layer 160, the magnetic pole layer 170 is characterized by a nose angle, $\alpha'$. In addition, the magnetic pole layer 170 also has a second nose angle $\beta$. The nose angle, $\alpha'$, is at least thirty degrees and not more than fifty degrees. In a preferred embodiment, the nose angle $\alpha'$ is at least thirty-five degrees and not more than forty-five degrees. The second nose angle $\beta$ has a similar range—at least thirty degrees and not more than sixty degrees, and more preferably at least forty degrees and not more than fifty degrees. Such a shape further improves the stable and desirable alignment of domains in the magnetic pole layer 160 parallel to the ABS. Consequently, a further reduction in domain lockup may be achieved.

Figure 7:
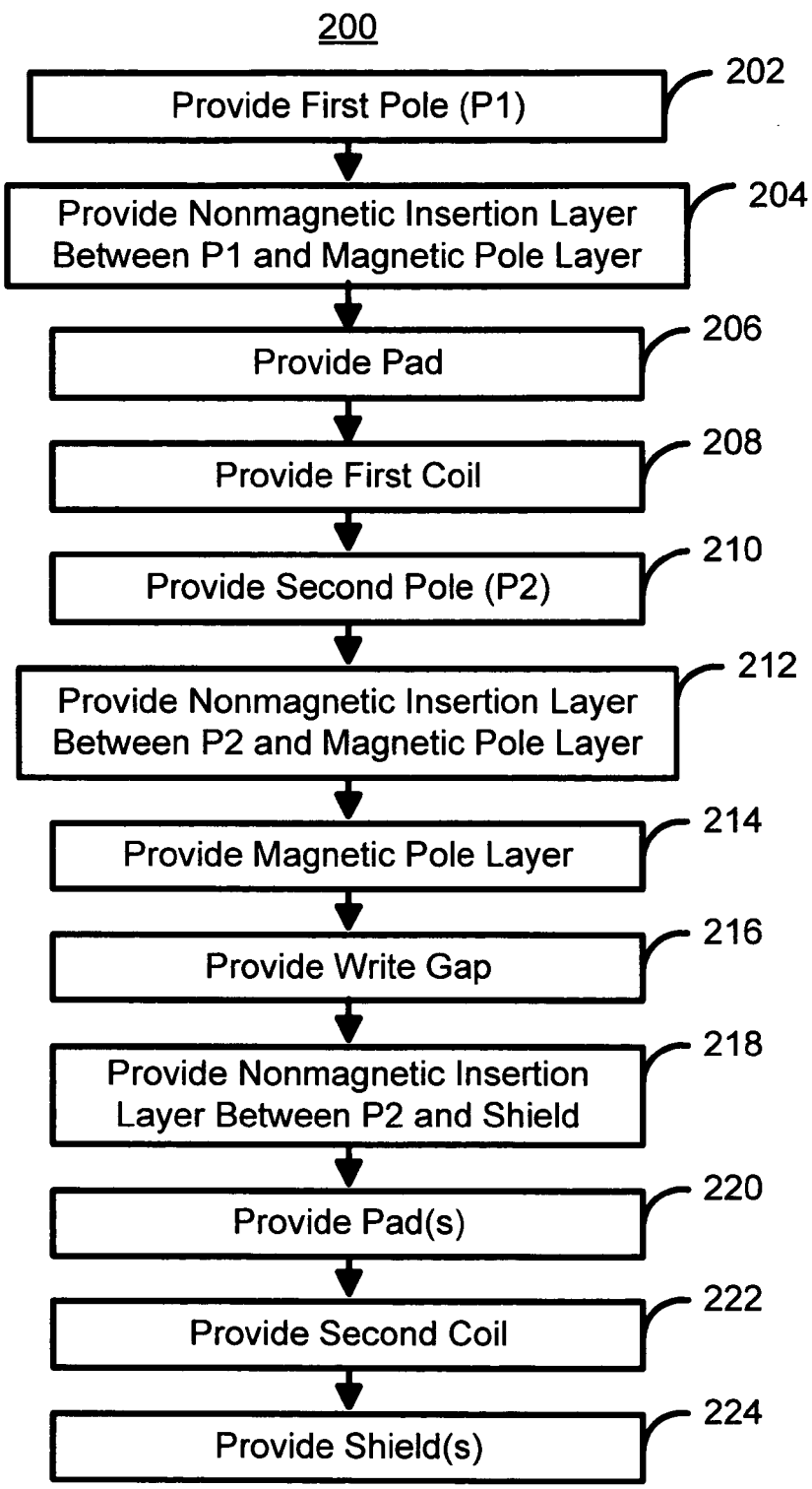
FIG. 7 is an exemplary embodiment of a method for providing a PMR head.

FIG. 7 is an exemplary embodiment of a method 200 for providing a PMR head, such as the PMR heads 100/100'. Consequently, the method 200 is described in the context of the PMR heads 100/100'. For clarity, the method 200 is described as having particular steps performed in a certain order. However, one of ordinary skill in the art will recognize that the method 200 may include addition and/or different steps that may be performed in another order. Further, for ease of explanation, the method 200 is described in the context of providing a single PMR head 100/100'. The method 200 also preferably commences after a shield (not shown) for a reader (not shown) has been provided. In addition, it is also understood that although described as single steps, a single step may include multiple sub-steps.

The P1 102/102' is provided, via step 202. In a preferred embodiment, step 202 includes plating P1 102/102'. The nonmagnetic insertion layer 108/108' is provided at the back gap region of P1 102/102', via step 204. The nonmagnetic insertion layer 108/108' is preferably provided in step 204 by changing the electroplating seed layer for the P1 pad 110/110' to the material used for the nonmagnetic insertion layer 108/108'. The pad 110/110' may be provided, via step 206. The coil 106/106' is provided, via step 208. In one embodiment, step 208 could be considered to be part of a multi-step process that provides more than one coil 106/106' and 124/124'.

P2 112 is provided, via step 210. Portions of P1 102/102' and P2 112/112' may be considered to be coupled at the back gap. Thus, when the coils 106 and 124 are energized, P1

102/102' and P2 112/112' are magnetically coupled. Step 210 is preferably performed by plating the pole P2 112.

The nonmagnetic insertion layer 128 may optionally be provided, via step 212. The nonmagnetic insertion layer 128 may be provided by using a nonmagnetic metal desired for the nonmagnetic insertion layer 128 as the seed layer of the magnetic pole layer 114/114'. The magnetic pole layer 114/114' is provided, via step 214. Step 214 may include fabricating the magnetic pole layer 114/114' such that nose angles α or α' and β are formed and that the desired nose length is provided.

The write gap 116/116' is provided, via step 216. The write gap 116/116' is adjacent to the front of the magnetic pole layer 114/114' and terminates at the ABS.

The nonmagnetic insertion layer 120/120' is provided, via step 218. The non-magnetic insertion layer 120/120' may be fabricated by simply depositing the write gap material at the location of the nonmagnetic insertion layer 120/120'. In such an embodiment, at least a portion of steps 216 and 218 can be considered to be merged. In such an embodiment, the mask used in forming the write gap 116/116' allows for deposition of material both at the front of the PMR head 100/100' and at the back gap. The pads 118 and 122 are provided, via step 220. Step 220 can be considered to include sub-steps that provide the pad 118 before the nonmagnetic insertion layer 120/120' and provide the pad 122 after the nonmagnetic insertion layer 120/120'.

The coil 124/124' is provided, via step 222. In one embodiment, step 222 could be considered to be part of a multi-step process that provides more than one coil 106/106' and 124/124'. The shield 126/126' is provided, via step 224. Thus, step 224 may include multiple sub-steps that provide portions 126A/126A' and 126B/126B'.

Thus, the method 200 may provide the PMR heads 100 and 100' and may use the magnetic pole layer 160 or 170. Thus, the PMR heads 100 and 100' and the method 200 may reduce domain lockup in PMR applications. As a result, the PMR heads 100 and 100' and method 200 may be suitable for higher density recording applications.

We claim:

1. A perpendicular magnetic recording (PMR) head having an air bearing surface, the PMR head comprising;
   a first pole including a first pole front region and a first pole back gap region;
   a second pole having a second pole front region and a second pole back gap region, the first pole back gap region being coupled with and the second pole back gap region;
   a first nonmagnetic insertion layer residing between the second pole back gap region and the first pole back gap region;
   a magnetic pole layer terminating at the air bearing surface, the magnetic pole layer having a front and a back terminating between the air bearing surface and the second pole back gap region, the magnetic pole layer having at least one pole angle of at least thirty degrees and not more than fifty degrees, at least a portion of the magnetic pole layer residing on the second pole;
   a write gap adjacent to the front of the magnetic pole layer;
   at least one shield, a first portion of the at least one shield adjacent to the write gap, a second portion of the at least one shield coupled with the second pole back gap region;
   a second nonmagnetic insertion layer residing between the second pole back gap region and the second portion of the at least one shield; and
   at least one coil residing between the at least one shield and the first pole.

2. The PMR head of claim 1 further comprising:
   an insulator, a portion of the insulator residing between the second pole front and the air bearing surface.

3. The PMR head of claim 1 wherein the first nonmagnetic insertion layer is adjacent to the first back gap region, the PMR head further comprising:
   a first pole pad between the first pole and the second pole, the first pole pad magnetically coupling the first pole and the second pole.

4. The PMR head of claim 1 further comprising:
   at least one pole pad between the second pole and the second portion of the at least one shield, a first portion of the least one pole pad being adjacent to the second pole back gap, a second portion of the least one pole pad adjacent to the second portion of the at least one shield, the least one pole pad magnetically coupling the second pole and the plurality of shields.

5. The PMR head of claim 4 wherein the second nonmagnetic insertion layer resides between the first portion and the second portion of the least one pole pad.

6. The PMR head of claim 4 wherein the first portion of the least one pole pad is a first pole pad and the second portion of the least one pole pad is a second pole pad.

7. The PMR head of claim 1 wherein the magnetic pole layer includes a nose, the at least one pole angle including a nose angle.

8. The PMR head of claim 7 wherein the nose angle is at least twenty degrees and not more than fifty degrees.

9. The PMR head of claim 7 wherein the nose angle is at least thirty-five degrees and not more than forty-five degrees.

10. The PMR head of claim 7 wherein the at least one angle includes an additional angle, the nose angle being between the nose and the additional angle.

11. The PMR head of claim 10 wherein the additional angle is at least thirty degrees and not more than sixty degrees.

12. The PMR head of claim 11 wherein the additional angle is at least forty degrees and not more than fifty degrees.

13. The PMR head of claim 1 further comprising:
    a third nonmagnetic insertion layer residing between the magnetic pole layer and the second pole.

14. A perpendicular magnetic recording (PMR) head having an air bearing surface, the PMR head comprising;
    a first pole including a first pole front region and a first pole back gap region;
    a second pole having a second pole front region and a second pole back gap region, the first pole back gap region being coupled with and the second pole back gap region;
    a first pole pad between the first pole and the second pole, the first pole pad magnetically coupling the first pole and the second pole;
    a first nonmagnetic insertion layer residing between the second pole back gap region and the first pole back gap region, the first nonmagnetic insertion layer residing between the first pole pad back gap and the first pole pad;
    a magnetic pole layer terminating at the air bearing surface, the magnetic pole layer having a front and a back terminating between the air bearing surface and the second pole back gap region, the magnetic pole layer having at least one pole angle of at least thirty-five degrees and not more than forty-five degrees, at least a portion of the magnetic pole layer residing on the second pole;
    a second nonmagnetic insertion layer residing between the magnetic pole layer and the second pole;
    a write gap adjacent to the front of the magnetic pole layer;

at least one shield, a first portion of the at least one shield adjacent to the write gap, a second portion of the at least one shield coupled with the second pole back gap region;
a first pole pad adjacent to the second pole back gap;
a third nonmagnetic insertion layer residing adjacent to the first pole pad; and
a second pole pad residing between the third nonmagnetic insertion layer and the second portion of the at least one shield, a first pole pad and the second pole pad magnetically coupling the second pole and the plurality of shields
at least one coil residing between the at least one shield and the first pole.

15. A method for providing a perpendicular magnetic recording (PMR) head having an air bearing surface, the method comprising;
providing a first pole including a first pole front region and a first pole back gap region;
providing a second pole having a second pole front region and a second pole back gap region, the first pole back gap region being coupled with and the second pole back gap region;
providing a first nonmagnetic insertion layer residing between the second pole back gap region and the first pole back gap region;
providing a magnetic pole layer terminating at the air bearing surface, the magnetic pole layer having a front and a back terminating between the air bearing surface and the second pole back gap region, the magnetic pole layer having at least one pole angle of at least thirty degrees and not more than fifty degrees, at least a portion of the magnetic pole layer residing on the second pole;
providing a write gap adjacent to the front of the magnetic pole layer;
providing at least one shield, a first portion of the at least one shield adjacent to the write gap, a second portion of the at least one shield coupled with the second pole back gap region;
providing a second nonmagnetic insertion layer residing between the second pole back gap region and the second portion of the at least one shield; and
providing at least one coil residing between the at least one shield and the first pole.

16. The method of claim 15 wherein the first nonmagnetic insertion layer is adjacent to the first back gap region, the method further comprising:
providing a first pole pad between the first pole and the second pole, the first pole pad magnetically coupling the first pole and the second pole.

17. The method of claim 15 further comprising:
providing at least one pole pad between the second pole and the second portion of the at least one shield, a first portion of the at least one pole pad being adjacent to the second pole back gap, a second portion of the at least one pole pad adjacent to the second portion of the at least one shield, the at least one pole pad magnetically coupling the second pole and the plurality of shields.

18. The method of claim 17 wherein the second nonmagnetic insertion layer resides between the first portion and the second portion of the at least one pole pad.

19. The method of claim 17 wherein the first portion of the at least one pole pad is a first pole pad and the second portion of the at least one pole pad is a second pole pad.

20. The method of claim 15 wherein the magnetic pole layer includes a nose and the at least one pole angle includes a nose angle.

21. The method of claim 20 wherein the nose angle is at least thirty degrees and not more than fifty degrees.

22. The method of claim 20 wherein the nose angle is at least thirty-five degrees and not more than forty-five degrees.

23. The method of claim 20 wherein the at least one pole angle includes an additional angle, the nose angle being between the nose and the additional angle.

24. The method of claim 23 wherein the additional angle is at least thirty five degrees and not more than sixty degrees.

25. The method of claim 24 wherein the additional angle is at least forty degrees and not more than fifty degrees.

26. The method of claim 15 further comprising:
providing a third nonmagnetic insertion layer residing between the magnetic pole layer and the second pole.

27. A method for providing a perpendicular magnetic recording (PMR) head having an air bearing surface, the method comprising;
providing a first pole including a first pole front region and a first pole back gap region;
providing a second pole having a second pole front region and a second pole back gap region, the first pole back gap region being coupled with and the second pole back gap region;
providing a first pole pad between the first pole and the second pole, the first pole pad magnetically coupling the first pole and the second pole;
providing a first nonmagnetic insertion layer residing between the second pole back gap region and the first pole back gap region, the first pole pad residing between the first pole pad back gap and the first pole pad;
providing a magnetic pole layer terminating at the air bearing surface, the magnetic pole layer having a front and a back terminating between the air bearing surface and the second pole back gap region, the magnetic pole layer having at least one pole angle of at least twenty-five degrees and not more than thirty-five degrees, at least a portion of the magnetic pole layer residing on the second pole;
providing a second nonmagnetic insertion layer residing between the magnetic pole layer and the second pole;
providing a write gap adjacent to the front of the magnetic pole layer;
providing at least one shield, a first portion of the at least one shield adjacent to the write gap, a second portion of the at least one shield coupled with the second pole back gap region;
providing a first pole pad adjacent to the second pole back gap;
providing a third nonmagnetic insertion layer residing adjacent to the first pole pad; and
providing a second pole pad residing between the third nonmagnetic insertion layer and the second portion of the at least one shield, a first pole pad and the second pole pad magnetically coupling the second pole and the plurality of shields providing at least one coil residing between the at least one shield and the first pole.

* * * * *